United States Patent
Sons et al.

[11] 3,932,789
[45] Jan. 13, 1976

[54] CURRENT SENSING PROTECTOR SYSTEM FOR A. C. MOTORS

[75] Inventors: James E. Sons, Sanger; Wayne C. Starnes, Dallas, both of Tex.

[73] Assignee: Detprotector, Inc., Dallas, Tex.

[22] Filed: Apr. 25, 1974

[21] Appl. No.: 464,112

Related U.S. Application Data

[63] Continuation-in-part of Ser. No. 412,809, Nov. 5, 1973.

[52] U.S. Cl. ............ 317/13 R; 317/33 SC; 317/46
[51] Int. Cl.² ........................................ H02H 7/085
[58] Field of Search .... 317/13 R, 13 A, 13 B, 13 C, 317/19, 46, 33 SC

[56] References Cited
UNITED STATES PATENTS

| | | | |
|---|---|---|---|
| 3,368,129 | 2/1968 | Chausse et al. | 317/13 R |
| 3,379,939 | 4/1968 | Obenhaus | 317/13 R |
| 3,696,288 | 10/1972 | Carman | 317/13 R |
| 3,742,302 | 6/1973 | Neill | 317/13 R |
| 3,742,303 | 6/1973 | Dageford | 317/13 A |

FOREIGN PATENTS OR APPLICATIONS

| | | | |
|---|---|---|---|
| 764,758 | 1/1957 | United Kingdom | 317/13 C |

*Primary Examiner*—James D. Trammell
*Attorney, Agent, or Firm*—Richards, Harris and Medlock

[57] ABSTRACT

The specification discloses a system for preventing current overload in a three phase dual speed A. C. motor in both high and low speed modes. The system includes current transformers for sensing the current level in each of the three phases applied to the motor. Circuitry is provided to detect the occurrence of a current level above each of a plurality of levels depending upon the speed of the motor. Circuitry is responsive to the detection of an overload current level in order to operate a switching transistor to terminate conduction of a triac in order to terminate the current flow through the phases. A light emitting device is connected to the switching transistor to emit light upon the occurrence of the overload condition. A light sensor senses operation of the light emitting device and initiates a timing cycle by a timing circuit during which the triac may not be rendered conductive.

2 Claims, 1 Drawing Figure

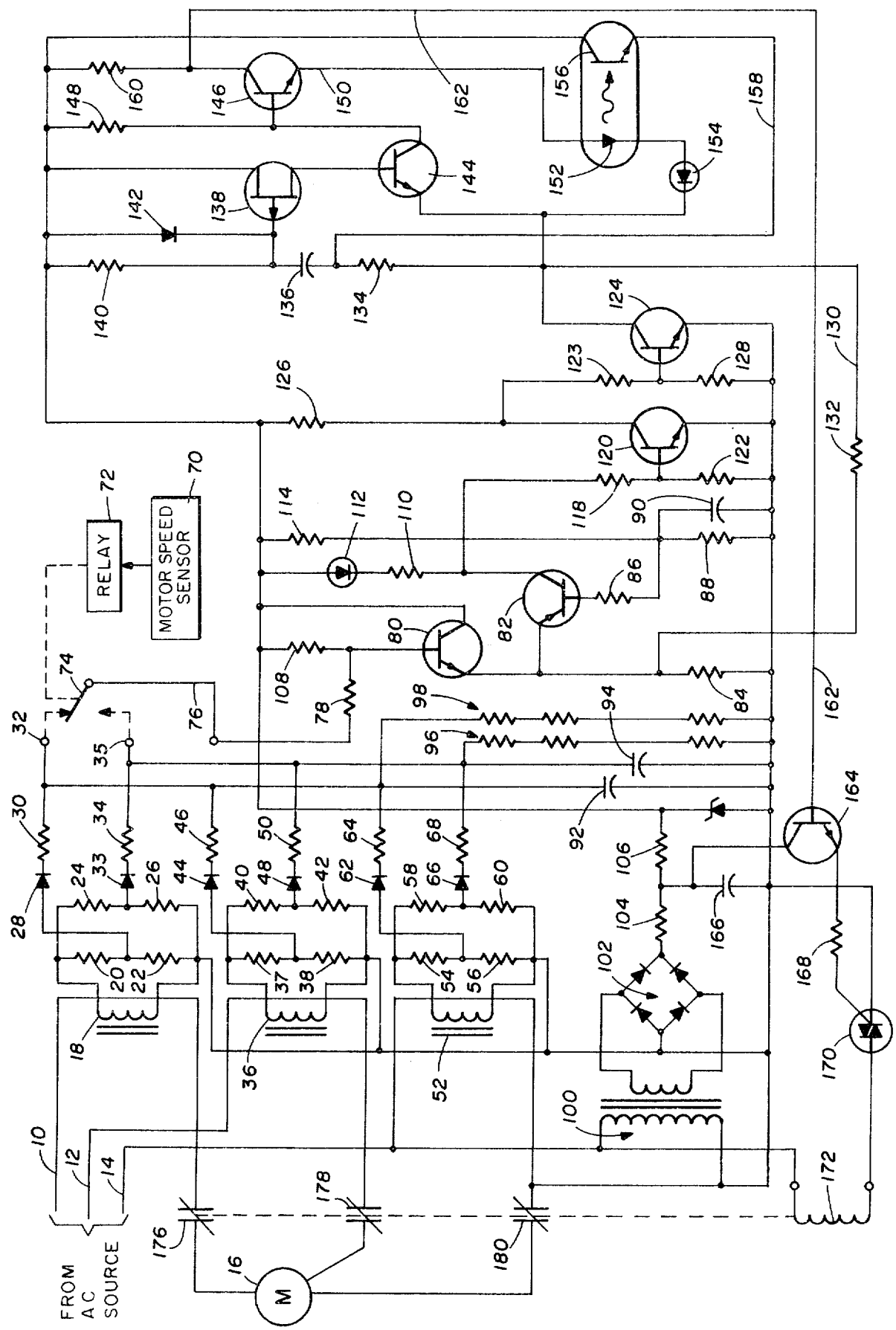

3,932,789

CURRENT SENSING PROTECTOR SYSTEM FOR A.C. MOTORS

RELATED APPLICATIONS

This application is a continuation-in-part of copending application Ser. No. 412,809, filed Nov. 5, 1973 and entitled "MULTILEVEL CURRENT SENSING DETECTOR SYSTEM FOR OVERCURRENT PROTECTION OF MULTI-SPEED A. C. MOTORS."

FIELD OF THE INVENTION

This invention relates to motor protection systems and more particularly relates to a system for providing protection to an A. C. motor and for preventing operation of the motor for a predetermined time interval after the occurrence of a malfunction.

THE PRIOR ART

A variety of different types of systems have been heretofore developed in order to prevent damage to electrical motors due to excessive current. Specifically, electrical circuits have been previously developed for sensing the current level applied to a three phase A. C. electrical motor and for terminating the supply of current to the motor when the sensed current rises above a predetermined level. However, more sophisticated multi-speed motors are currently becoming widely used, and a need has thus arisen for a system for providing current overload protection to a multi-speed motor in each different speed mode. Moreover, a need has arisen for timing circuitry operable upon the occurrence of an overload in order to prevent re-energization of the motor during a specified time period after the overload occurrence.

SUMMARY OF THE INVENTION

In accordance with the present invention, a system is provided for protecting an alternating current phase line from current above a plurality of different levels during various operating modes. Circuitry is provided to sense the current level on the phase line and a detection system detects the occurrence of the current level above each of the plurality of levels. Overload protection circuitry is responsive to the detection system for terminating current flow through the phase line upon detection of current level above any one of the plurality of predetermined levels. A timing circuit is operable upon the occurrence of an overload condition in order to prevent re-energization of the system for a predetermined time interval.

In accordance with another aspect of the invention, a system is provided for preventing current overload in a multiphase multi-speed motor in low and high speeds which includes circuitry for sensing the current level in each of the phases of the motor. A resistor divider network is connected to each of the sensors and includes a low speed configuration and a high speed configuration. Circuitry is responsive to low speed operation of the motor for connecting the outputs of each of the low speed configurations to a summing location and is further responsive to high speed operation of the motor for connecting the output of each of the high speed configurations to the summing location. Circuitry is responsive to the voltage at the summing location for generating an overload signal upon the occurrence of an overload current in any of the phases. A triac is connected to control flow through the phase. A switching transistor is operable in response to the overload signal for switching the triac to terminate current flow through the phases. A light emitting device is connected to the switching transistor for emitting light upon the occurrence of the overload signal. A timing circuit is connected to the switching transistor and a sensor is provided to sense light from the light emitting device and to initiate a timing cycle by the timing circuit. The triac may not be switched to again allow current flow through the phases during the timing cycle.

DESCRIPTION OF THE DRAWING

For a more complete understanding of the present invention and for further objects and advantages thereof, reference is now made to the following description taken in conjunction with the accompanying drawing, in which the FIGURE illustrates a schematic diagram of the preferred embodiment of the invention.

DESCRIPTION OF THE PREFERRED EMBODIMENT

Referring to the FIGURE, a three phase A. C. line includes phase lines 10, 12 and 14 which are connected to supply alternating current three phase voltage to a multi-speed A. C. motor 16. While it will be understood that the motor 16 could have any number of operating speeds, in the preferred embodiment the present system will be described for use with a motor 16 having a low and a high speed mode of operation. A current transformer 18 is connected to phase line 10 and is connected to a voltage divider network including resistors 20, 22, 24 and 26. The juncture of resistors 20 and 22 is connected to the anode of a diode 28 which is connected in series with a resistance 30 connected to a terminal 32. A diode 33 is connected to the juncture of resistors 24 and 26 and is connected in series with the resistance 34 connected to a terminal 35.

A second current transformer 36 is disposed adjacent the phase line 12 and is connected to a resistance divider network including resistances 37, 38, 40 and 42. A diode 44 is connected to the juncture of resistors 37 and 38 and is connected through a resistance 46 to the terminal 32. A diode 48 is connected to the juncture of resistors 40 and 42 and is connected through a resistor 50 to the terminal 35.

A third current transformer 52 is disposed adjacent the phase line 14 and is connected to a resistor network including resistors 54, 56, 58 and 60. A diode 62 is connected to the juncture of resistors 54 and 56 and is connected through a resistor 64 to the terminal 32. A diode 66 is connected to the juncture of resistors 58 and 60 and is connected through a resistor 68 to the terminal 35.

A motor speed sensor 70 is responsive to the speed of operation of motor 16 in order to operate a relay 72 between two positions. The relay 72 is operable to close the relay switch 74 between either terminal 32 or 35. When the motor 16 is operating at the high speed, the sensor 70 operates relay 72 in order to place the switch 74 in contact with terminal 32. When the sensor 70 senses that the motor 16 is operating at the low speed, the sensor 70 operates the relay 72 to place the switch 74 in contact with terminal 35. The divider networks connected to the current transformers thus provide two resistive configurations in order to enable overload sensing of the motor 16 in both the high and low speed modes.

The relay switch 74 is connected via lead 76 through a resistor 78 to the base of a transistor 80. The emitter of transistor 80 is connected with the emitter of a transistor 82 to form a differential amplifier. The emitter of transistor 80 is connected to circuit ground through a resistor 84, while the base of transistor 82 is connected through resistances 86 and 88 to circuit ground. A capacitor 90 is connected across resistor 88. Capacitor 92 is connected between circuit ground and terminal 32. A capacitor 94 is connected between circuit ground and terminal 35. Three series resistors 96 are connected in series between terminal 35 and circuit ground, while three series connected resistors 98 are connected between circuit ground and terminal 32.

A transformer 100 is connected across phase lead 14 to provide a source of bias voltage for operation of the system. The output of the transformer is connected to a rectifying diode bridge 102 which supplies approximately 10 volts D. C. bias voltage via resistors 104 and 106 to the protection circuitry of the invention.

The base of transistor 80 is connected through a resistor 108 to the source of bias voltage, while the collector of transistor 80 is tied directly to the source of bias voltage. The collector of transistor 82 is connected through a resistor 110 and a diode 112 to the source of bias potential. The juncture of resistors 86 and 88 is tied through a resistor 114 to the source of bias voltage.

The output of the differential amplifier comprising transistors 80 and 82 is connected through a resistor 118 to the base of a transistor 120. The base of transistor 120 is tied to circuit ground via resistor 122. The emitter of transistor 120 is tied directly to circuit ground, while the collector of transistor 120 is applied via resistor 123 to the base of a transistor 124. The collector of transistor 120 is tied through resistor 126 to the source of bias potential. The base of transistor 124 is connected to circuit ground through a resistor 128, while the emitter of transistor 124 is tied directly to circuit ground. Transistors 120 and 124, as will be subsequently described, comprise a digital circuit to provide fast switching of the system and to provide the correct logic for driving the timer of the invention.

The collector of transistor 124 is tied through a feedback loop 130 including a resistor 132 to the emitter of transistor 82 in order to provide stabilization to eliminate drifting of the circuit from temperature changes and fluctuations in the line voltage. The collector of transistor 124 is also connected through a resistor 134 to a charging capacitor 136. A terminal of capacitor 136 is connected to the gate of a field effect transistor (FET) 138, which may comprise for example a 2N4343 transistor. A resistor 140 and diode 142 are connected in parallel between the FET 138 and the source of bias voltage. The drain of FET 138 is connected to the source of bias potential, while the source of the FET 138 is connected to the base of a transistor 144.

The emitter of transistor 144 is tied to the collector of transistor 124. The collector of transistor 144 is connected to the base of a switching transistor 146 and is also connected through a resistor 148 to the source of bias voltage. The emitter of transistor 146 is connected via lead 150 to a light emitting diode (LED) 152. The LED 152 is connected through a diode 154 to the collector of transistor 124. The LED 152 is optically coupled with a light sensitive transistor 156. Transistor 156 has its collector tied to the source of bias voltage and its emitter connected via lead 158 to the juncture of resistor 134 and capacitor 136.

The collector of transistor 146 is connected to the source of bias voltage through a resistor 160 and is tied via lead 162 to the base of a transistor 164. The collector of transistor 164 is connected to the juncture of resistors 104 and 106 to receive bias voltage. A capacitor 166 is connected between the collector of transistor 164 and circuit ground. The emitter of transistor 164 is connected through a resistor 168 to the gate of a semiconductor triac 170. Triac 170 is connected between the circuit ground and a terminal of the contractor relay 172. The opposite terminal of the relay 172 is connected to phase line 14. The contactor relay operates contactor switches 176, 178 and 180 respectively connected in phase lines 10, 12 and 14. In normal operation, the triac 170 is energized, thereby energizing relay 172 in order to maintain the switches 176, 178 and 180 in their closed positions to enable normal operation of the motor 16. As will be subsequently described, upon detection of an overload condition, the transistor 164 is de-energized, thereby de-energizing triac 170. This causes the de-energization of relay coil 172 in order to open the switches 176–180 to prevent further current flow to the motor 16 to provide overload protection thereto.

In operation of the circuitry shown in the FIGURE, alternating current three phase voltage is applied via phase leads 10, 12 and 14 and through the closed relay switches 176, 178 and 180 in order to operate the motor 16. If the motor is operating at the low speed, the sensor 70 operates the relay 72 in order to connect the switch 74 with the terminal 35. This connects a portion of the three divider networks to the terminal 35 which serves as a summing point. The current transformers 18, 36 and 52 sense the current flowing through the phase lines 10, 12 and 14 and thus the resistive networks generate voltages across the resistor divider networks which are applied to the summing point 35. Under normal operating conditions, the resulting voltage at terminal 35 is below a reference voltage established by resistors 114 and 88. Capacitor 90 is provided to reduce noise from line transients and the like. During normal operation, transistor 80 is nonconductive and transistor 82 is turned on. Transistor 120 is normally off and transistor 124 is normally on. The FET 138 and transistor 144 are normally on, while switching transistor 146 is normally off. As previously noted, transistor 164 and triac 170 are normally on.

However, upon the occurrence of an overload condition on any of the phase lines 10, 12 and 14, the summed voltage at terminal 35 will increase. This increase in voltage is applied to the differential amplifier comprising transistors 80 and 82. When the increase in voltage becomes greater than the reference voltage determined by resistors 114 and 88, the differential amplifier flips and transistor 80 is turned on and transistor 82 is turned off. The collector of transistor 82 becomes positive and the positive voltage is coupled to turn transistor 120 on. The collector of transistor 120 goes to essentially zero voltage and thus transistor 124 is turned off. The collector of transistor 124 then goes high. Transistors 120 and 124 thus act as a digital logic circuit to provide fast switching and to provide the correct logic to drive the timing circuitry of the invention.

The high voltage at the collector of transistor 124 is then applied to back bias the drain of the FET 138 and the base of the transistor 144, thereby turning the FET 138 and transistor 144 off. In normal operation, capacitor 136 is charged through the diode 142 such that approximately 10 volts is maintained across the capacitor 136. The resistor 140 has a high value, and thus the capacitor 136 is not able to quickly discharge in the reverse direction. Thus, when the collector of transistor 124 goes high, the voltage across the capacitor is essentially doubled, thereby back biasing FET 138 and transistor 144. When transistor 144 becomes nonconductive, the voltage across resistor 148 is applied to the base of transistor 146, thereby turning transistor 146 on.

The conduction of transistor 146 causes transistor 164 to become nonconductive, thereby de-energizing triac 170. This causes the contactor relay 172 to drop out, thereby opening the relay switches 176, 178 and 180. This interrupts the power to the motor 16 and the motor 16 is stopped in order to prevent damage to the motor.

When transistor 146 becomes conductive, current is applied through the LED 152 and light is emitted to the light sensor 156. Sensor 156 then becomes conductive and essentially applies a short to a terminal of the capacitor 136. Capacitor 136 then discharges until the FET 138 and transistor 144 are no longer back biased and again become conductive. At this point, the transistor 146 is turned off and the LED 152 no longer emits light and the discharge of the capacitor 136 is terminated. The time for the capacitor 136 to discharge determines the timing cycle of the circuit. In one embodiment, a timing period of approximately 5½ minutes was provided. During this timing cycle, the motor 16 cannot again be energized.

The above-described operation of the circuit also occurs when the power in any one of the phase leads 10, 12 or 14 is temporarily interrupted. When the motor 16 is operating in the high speed, the sensor 70 operates the relay 72 in order to move the switch 74 into contact with terminal 32. Different portions of the resistor divider networks are then connected to the system in order to provide high speed sensing. The operation of the timing circuit and switching and protection portion of the circuit is identical to that previously described.

An important aspect of the invention is that the operation of the voltage sensing section of the circuit is identical regardless of whether or not the motor 16 is operating in the high or low speed mode. This eliminates the requirement of two separate voltage level detecting sections and thereby decreases the complexity and improves the reliability of the system.

Although it will be understood that the component values of the present system may be varied in accordance with the desired operating capabilities, the following component values have been found to work well in practice:

| | | | |
|---|---|---|---|
| C90 | 20µf | R20 | 4.7K ohms |
| C92 | 20µf | R24 | 4.7K ohms |
| C94 | 20µf | R30 | 27K ohms |
| C134 | 100µf | R34 | 27K ohms |
| C166 | 220µf | R37 | 4.7K ohms |
| R22 | 200 ohms | R40 | 4.7K ohms |
| R26 | 200 ohms | R46 | 27K ohms |
| R38 | 200 ohms | R50 | 27K ohms |
| R42 | 200 ohms | R54 | 4.7K ohms |
| R56 | 200 ohms | R58 | 4.7K ohms |
| R60 | 200 ohms | R64 | 27K ohms |
| R104 | 4.7 ohms | R68 | 27K ohms |
| R106 | 75 ohms | R84 | 1K ohms |
| R108 | 1 Meg | R88 | 10K ohms |
| R132 | 1 Meg | R110 | 100K ohms |
| R140 | 3.3 Meg | R114 | 18K ohms |
| R148 | 1K | R118 | 10K ohms |
| R160 | 1K | R122 | 27K ohms |
| R168 | 1K | R123 | 10K ohms |
| | | R126 | 10K ohms |
| | | R128 | 47K ohms |
| | | R134 | 2.7K ohms |

An important aspect of the invention is that the LED 152 and light sensor 156 provides a high degree of isolation to the timing circuit when the LED 152 is not energized.

The present system thus provides an efficient and accurate system for continuously detecting overload conditions and line interruptions in multi-phase motors. As previously noted, the present system may be utilized with slight modifications on single speed motors or on multi-speed motors having more than two operational speeds. The present system requires sensing only in the primary three phase lines applied to the motor and does not require any sensing of the secondary leads of the motor. While the present system works well in preventing overload on multi-speed motors driving air conditioning systems or the like, it will be apparent that the present system is also applicable for use with any A. C. motor.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for preventing current overload in a multiphase multi-speed alternating current motor in low and high speeds comprising:
   current transformers for sensing the current level in each of said phases of said motor,
   a resistor divider network connected to each of said sensing means and including a low speed configuration and a high speed configuration,
   means responsive to low speed operation of said motor for connecting the outputs of each of said low speed configurations to a summing location and further responsive to high speed operation of said motor for connecting the outputs of each of said high speed configurations to the summing location,
   a differential amplifier responsive to the voltage at the summing location for generating an overload signal upon the occurrence of an overload current in any of said phases,
   a triac connected to control current flow through said phases,
   a switching transistor operable in response to said overload signal for switching said triac to terminate current flow through said phases,
   a light emitting device connected to said switching transistor for emitting light upon the occurrence of said overload signal,
   a timing circuit including a field effect transistor connected to control said switching transistor and a timing capacitor for controlling the state of the field effect transistor, and
   light sensor means for sensing said light and for initiating a timing cycle by said timing circuit during which said triac may not be switched to allow current flow through said phases.

2. The system of claim 1 and further comprising:
a voltage transformer connected to one of said phases, and a diode bridge connected to said voltage transformer for providing direct current voltage to said triac.

* * * * *